United States Patent [19]

Eder

[11] 4,099,107
[45] Jul. 4, 1978

[54] APPARATUS FOR SYNCHRONIZING AC-MOTORS

[75] Inventor: Josef Eder, Leggiuno, Italy

[73] Assignee: European Atomic Energy Community (EURATOM), Luxembourg

[21] Appl. No.: 687,306

[22] Filed: May 17, 1976

[30] Foreign Application Priority Data

May 16, 1975 [GB] United Kingdom ............... 20872/75

[51] Int. Cl.² .............................................. H02P 5/40
[52] U.S. Cl. ..................................... 318/227; 318/230; 318/231
[58] Field of Search ........................ 318/227, 230, 231

[56] References Cited
U.S. PATENT DOCUMENTS

| | | | |
|---|---|---|---|
| 3,878,445 | 4/1975 | Kirkham et al. ................ | 318/227 X |
| 3,906,324 | 9/1975 | Smith .............................. | 318/573 X |
| 3,971,972 | 7/1976 | Stich ................................. | 318/227 |
| 3,978,383 | 8/1976 | Carthy ............................. | 318/227 |

*Primary Examiner*—Gene Z. Rubinson
*Attorney, Agent, or Firm*—Stevens, Davis, Miller & Mosher

[57] ABSTRACT

An apparatus for controlling an AC-motor, with a feed-back arrangement in which the feed-back signal is the output signal of a partly mechanical pulse generator coupled to the shaft of the motor, comprising a microprocessor to which is fed a feed-back signal and a reference signal and a digital clock which sends output signals to said micro-processor, said micro-processor generating signals through a first set of output controls for controlling the frequency and phase of the AC-power supplied to the motor by comparing the reference signal and the arrival times of the feed-back pulses as indicated by the digital clock.

7 Claims, 4 Drawing Figures

APPARATUS FOR SYNCHRONIZING AC-MOTORS

This invention relates to control apparatus for the control or the synchronisation of the rotation of AC-motors.

The high precision control or synchronization of the rotation of one or more motor shafts is an important problem in the most diverse technical fields — e.g. paper manufacturing, cinecamera shutters and film moving motors and synchronised shutters in measuring equipment. Asynchronous motors, which have the advantage of being simple, robust and relatively low priced, are unfortunately not very suitable for such applications because their speed of rotation is strongly influenced by variations in the load of the shaft.

It is known from "Deutsche Offenlegungsschrift" No. 2,006,362 to synchronise several synchronous AC-motors with a reference pulse signal by comparing the phase of this with the phases of pulse signals derived from the rotations of the motor shafts and which are of the same frequency as the reference signal. The result of the comparison is used for influencing the phase of the output AC-voltage of the motor power supply — a DC to AC converter — in such a way that the rotation of each motor shaft is kept synchronous with the phase of the reference signal. As only the phase of the AC voltage is influenced, this technique is not applicable to the control of synchronous AC-motors.

It therefore is the object of the present invention to provide in an economic way a continuous regulation of both angular velocity and phase of rotation of one or more motor shafts in order to make it feasible to use both synchronous and asynchronous AC-motors in applications where a high precision control or synchronisation is needed.

The present invention provides an apparatus for controlling AC-motors, with a feed-back arrangement in which the feed-back signal is the output signal of an electromechanical pulse generator coupled to the shaft of the motor, in which the feed-back and a reference signal are connected to a micro-processor, to which also the output signals of a digital clock are connected; and in which the micro-processor is enabled to generate signals for controlling the frequency and the phase of the AC-power supplied to the motor by comparing the reference signal and the arrival times of the feed-back pulses as indicated by the digital clock.

To make the invention more readily understood reference is made to the attached drawings in which.

Figure 1:
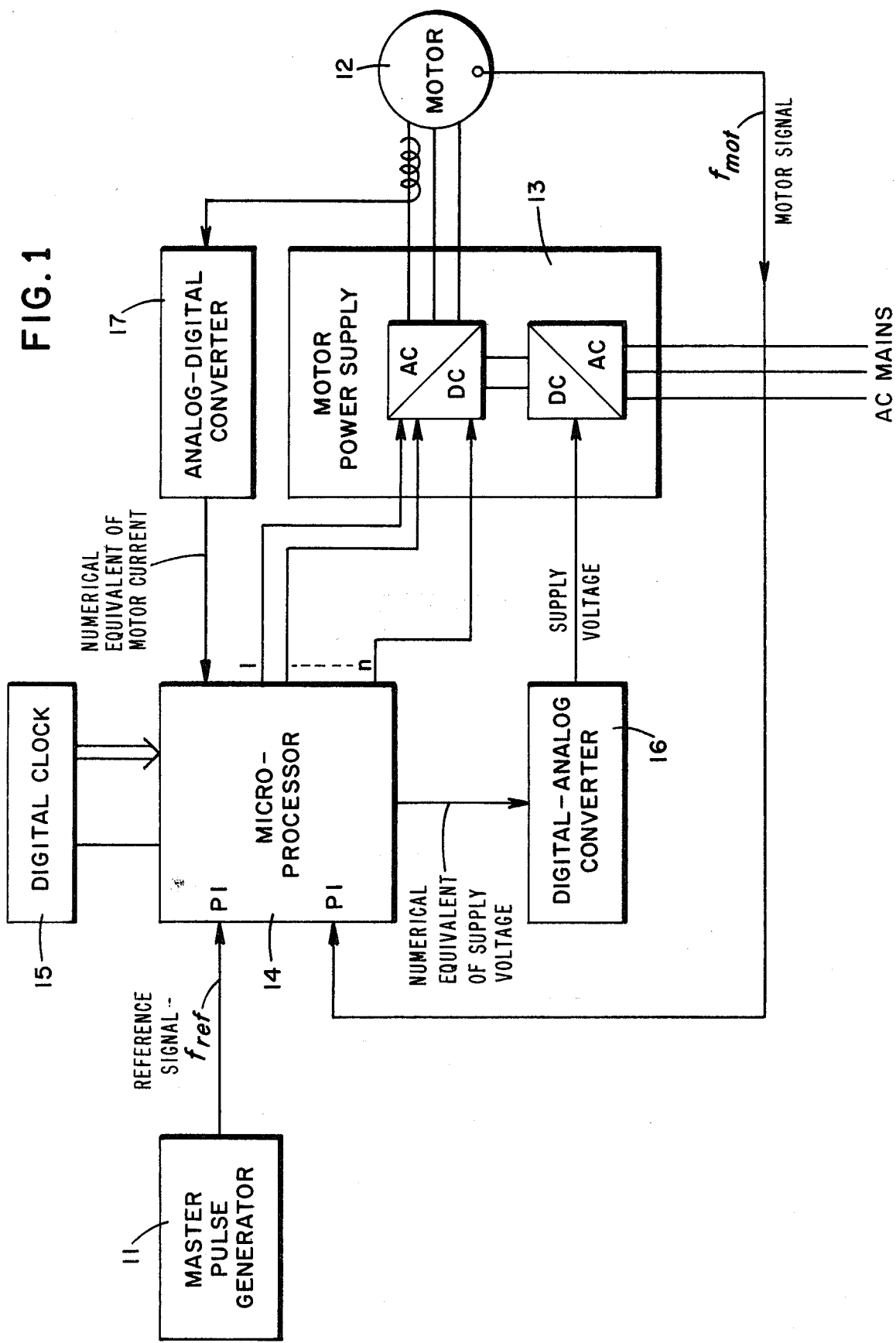
FIG. 1 shows a block diagram of a first preferred embodiment of the invention.

In FIG. 1, 11 designates a master pulse generator with a high degree of frequency stability providing a reference signal — $f$ ref — as its output signal, 12 designates the motor and 13 the motor power supply, which preferably consists of an AC-DC converter with controllable output voltage and a DC-AC converter with controllable output frequency and phase. The reference signal — $f$ ref — and a motor signal, the frequency of which — $f$ mot — is proportional to the angular velocity of the shaft of the motor 12, are both fed to a micro-processor 14 in such a way that a pulse on either of the two signal lines will give rise to an interrupt in the program of the micro-processor.

The micro-processor must be programmed in such a way that it will perform the following functions:

Each time a program interrupt occurs the micro-processor will read the time indicated by a digital clock 15. In its memory it will store for each of the two interrupt signals a series comprising at least two consecutive time indications. Based upon the two series of time indications it will calculate the differences in frequency and phase between $f$ ref and $f$ mot. Further the micro-processor will generate control signals — preferably sequences of 6 pulses — for the motor power supply 13; and it will currently use the calculated differences in frequency and phase between $f$ ref and $f$ mot for regulating the control signals in such a way that the frequency and phase differences are kept constant.

For the sake of the simplicity of the description it is assumed that the frequencies of the signals $f$ ref and $f$ mot are equal. It is obvious, however, that by simple reprogramming, the micro-processor can be enabled to perform its controlling function, if only the ratio between the two frequencies can be expressed as a rational number.

Figure 2:
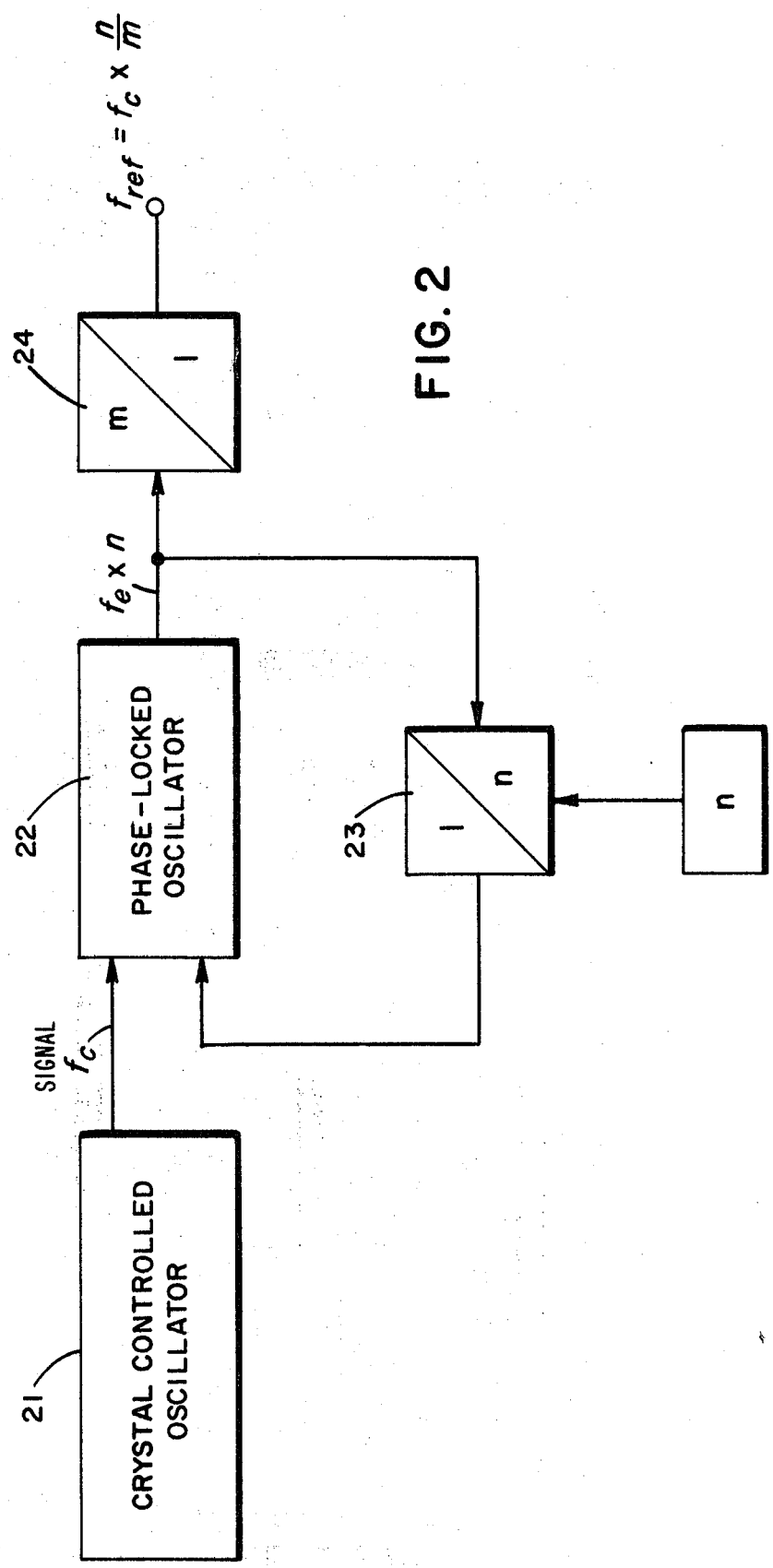
FIG. 2 shows a detailed block diagram of a preferred embodiment of the master pulse generator of the control apparatus shown in FIG. 1.

A variable speed of rotation is easily achieved by varying $f$ ref. This must, however, be done in such a way that the stability of the frequency and phase of the reference signal is not endangered. To achieve this an arrangement of the master generator as shown in FIG. 2 is particularly advantageous. In FIG. 2 a phase-locked oscillator 22 is controlled by a signal — $f_c$ — from a crystal controlled oscillator 21 and by a signal obtained by dividing the frequency of the output signal of the phase-locked oscillator by an integral number — $n$ — in a suitable electronic circuit 23. The value of the integral number can be controlled from outside the master generator by appropriate well known means. The control of the phase-locked oscillator is arranged in such a way that the frequency of its output signal is maintained at the constant value $f_e \times n$. The frequency of the output signal of the phase-locked oscillator can further be divided by a fixed integral number — $m$ —, in a suitable circuit 24, if this should be desirable for technical reasons - e.g. for making the value of $f_{ref}$ convenient.

The embodiment of the invention shown in FIG. 1 and FIG. 2 is particularly advantageous when the invention is used for controlling a motor located a considerable distance from the place where the adjustment of the desired speed of rotation takes place.

When in such a case, the master generator is located where the adjustment of the speed of rotation takes place, and the other circuits are located close to the motor, the only signal to be transferred between the two parts of the control apparatus is the reference signal. The micro-processor can easily be programmed to check that the reference signal is not disturbed by noise. It therefore can be transmitted by technically simple means.

Figure 3:
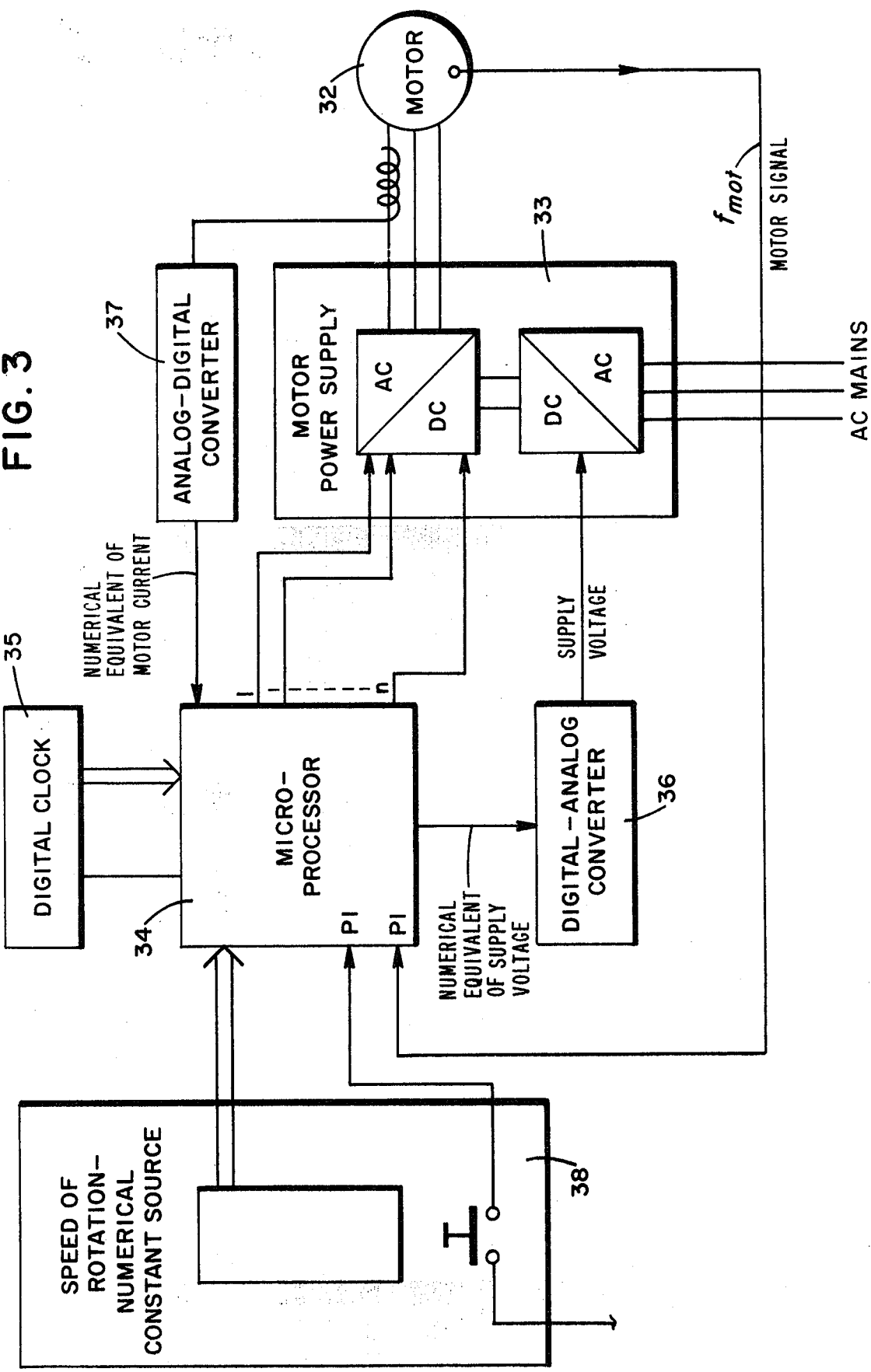
FIG. 3 shows a block diagram of a second preferred embodiment of the invention.

In other cases than the one dealt with in the preceding paragraph the embodiment of the invention shown in FIG. 3 may be economically advantageous.

The difference between the two embodiments of the invention shown in FIG. 1 and FIG. 3 is that in the embodiment shown in FIG. 3 the master generator is replaced by means 38 for supplying to the microprocessor the desired speed of rotation in the form of a numerical constant expressing for instance number of revolutions per time unit; said means being preferably a suitable number of switches each with 10 positions which can be adjusted to indicate said numerical constant and a push button by which an interrupt in the program of the micro-processor can be effectuated when a new value of the speed of rotation has been chosen.

In this case the micro-processor must be programmed in such a way that each time a new speed of rotation has been chosen and been read by the micro-processor it will be converted into the corresponding numerical equivalent of $1/f$ ref. Each time the motor signal causes an interrupt in the program of the micro-processor it will not only read a number from the output contacts of the digital clock, but also calculate a new element in a series of numbers representing $f$ ref by adding the numerical equivalent of $1/f$ ref to the last element of said series.

The invention is ideally suited for synchronising several AC-motors irrespective of their locations in relation to each other. In this case the arrangement shown in FIG. 4 is advantageously applied.

Figure 4:
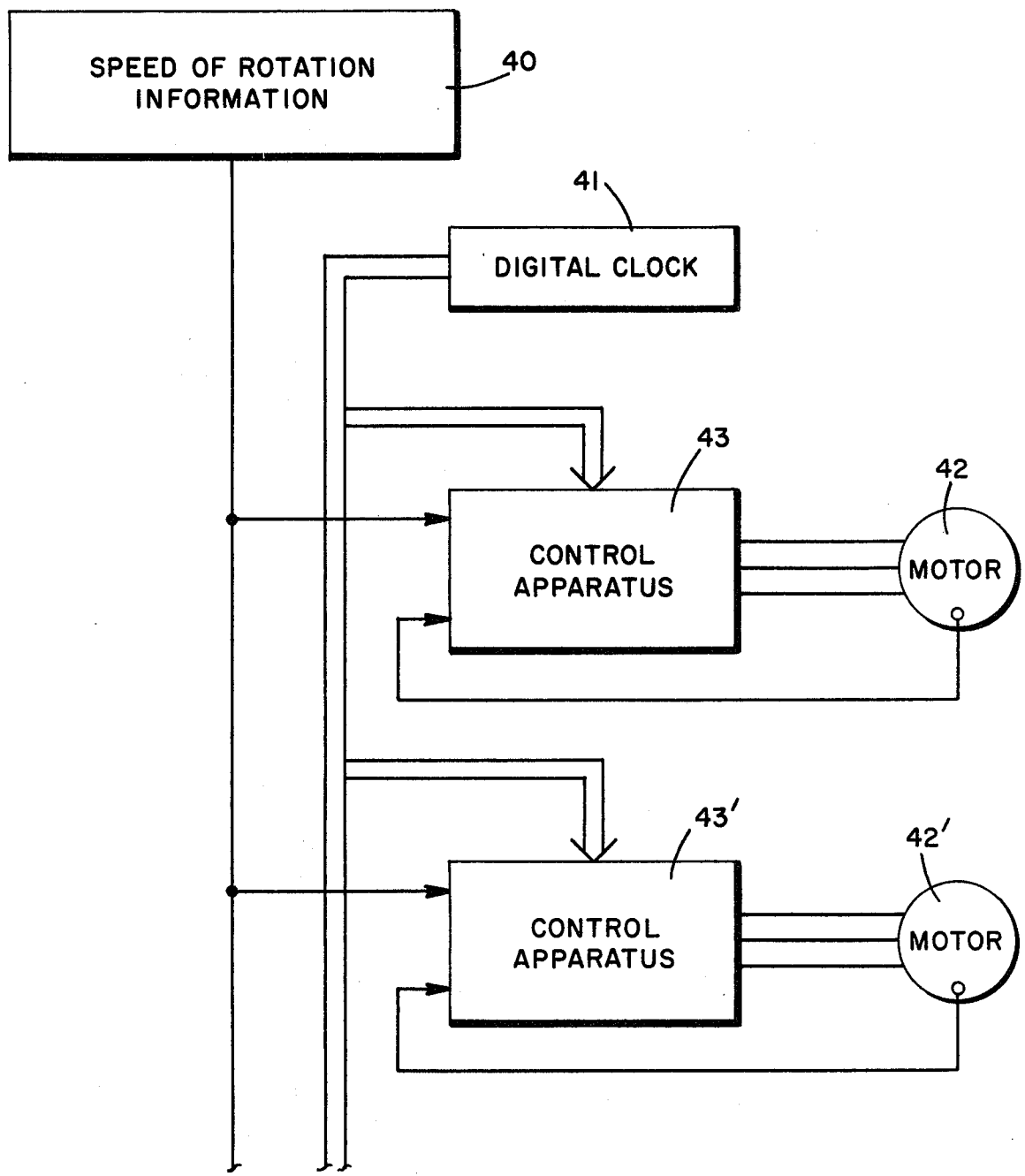
FIG. 4 shows the use of the invention for synchronising the rotation of several AC-motors.

In FIG. 4, 41 designates a digital clock common to all control apparatus; 40 designates common means for supplying information on the desired speed of rotation either as $f$ ref or as number of revolutions per time unit dependent upon, which of the two preferred embodiments of the invention shown in FIG. 1 and FIG. 3 is used; 43 and 43' designate control apparatus substantially as shown in FIG. 1 or FIG. 3 but without digital clocks and without means for providing information on the desired speed of rotation; and 42 and 42' designate two of the motors to be synchronised. By using a common digital clock, a common source of information on the desired speed of rotation, identical means for generating $f$ mot and identical programs in the micro-processors, it is assured that the motors will always be supplied with power in such a way that all motor signals will be kept in synchronism. Therefore, if the synchronisation desired has once been established it will be maintained as long as the functioning of all elements of the arrangement is maintained. The initial synchronization of the motors can if needed by achieved by various mechanical or electrical means — e.g. by rotating the stators of the motors or the static parts of the means used for generating the motor signals or by signalling to the control apparatus to disregard a number of pulses of either the motor signal or the reference signal if present. Other ways of achieving an initial synchronisation can easily be devised by any person skilled in the art.

If a large degree of variation of the speed of rotation of the motors is desired it will be necessary to adjust the output voltage of the motor power supply to match the electromotive force induced in the stator coils of the motor at the desired speed of rotation. Also when the motor is started it is desirable to raise the supply voltage gradually in order to achieve a smooth start of the motor. This problem is readily solved by means of the invention in the following way.

Each time the micro-processor calculates the frequency of the motor signal it also calculates a numerical equivalent of the supply voltage considered most ideal at the actual speed of rotation. The conversion of the calculated numerical equivalent into the desired supply voltage is preferably done by letting a digital-analog converter 16 or 36 convert the numerical equivalent of the supply voltage into a voltage or an electrical current suitable for being used as set-point signal for the voltage control circuit preferably included in the AC-DC converter which preferably is a part of the motor power supply.

The control of the motor supply voltage may be further improved to achieve a desired relationship between the speed of rotation of the motor and the maximum torque of the motor. Preferably this is done by measuring either the AC current in one of the stator coils of the motor or the DC current flowing between the AC-DC and the DC-AC converters of the motor power supply; by converting the measured current by means of an analog digital converter 17 or 37 into its numerical equivalent; by feeding this numerical equivalent into the micro-processor in such a way that each time it has calculated the numerical equivalent of the supply voltage matching the actual speed of rotation it uses the numerical equivalent of the current for modifying the numerical equivalent of the supply voltage before supplying it to the digital analog converter in such a way that the AC current in the stator coils of the motor is made to correspond to the torque desired at that particular speed of rotation.

If for surveillance purposes it is desired to display in numerical form one or more of the parameters: speed of rotation, motor supply voltage and motor current; this can easily be achieved in an inexpensive way by providing an adequate number of output contacts on the micro-processor to which one or more numerical displays can be connected and through which the micro-processor can put out one or more of the numerical equivalents of said parameters already present in its memory. It must be noted however that without special measure being taken, the numerical equivalent of the motor supply voltage is not the numerical equivalent of the actual voltage present but only the numerical equivalent of the set-point of the voltage regulator and therefore in no way confirms that the voltage desired is actually present. By suitable programming of the micro-processor the numerical values displayed may be expressed in any unit of measurement. If desirable for reasons of economy a common display may be used for displaying more than one parameter selected by means of a switch.

In all embodiments of the invention the micro-processor must fullfil the condition that the run-time of the control program be less than the reciprocal of the product of the frequency of the alternating current to be supplied to the motor and the number of pulses in the sequence controlling the DC-AC converter of the motor power supply — e.g. 100 cps and 6 pulses gives maximum run-time: $1/6 \times 100s = 16.7$ ms.

In case it is impossible to make the run-time of the total control program sufficiently short it may be necessary to distribute some of the control functions over different runs of the control program — e.g. in one run the updating of the numerical equivalent of the supply voltage may take place and in the next run it may be corrected according to the result of a current measurement and fed to the digital analog converter.

What is claimed is:

1. An apparatus for controlling the frequency and phase of power signals supplied to an AC-motor having a rotating shaft comprising:
    means responsive to said motor shaft rotations for providing a first feedback signal train from said motor representative of the angular velocity of said shaft, means for supplying a reference signal representing a desired frequency and phase for said motor shaft rotation, digital clock means for supplying time signals, a microprocessor means for storing time signals from said digital clock means representative of the arrival times of signals in said first feedback signal train, for storing information signals representative of said reference signal, for calculating from said stored arrival time information and reference information signals the relative frequency and phase displacement of said first feedback signal train with respect to said desired frequency and phase as represented by said reference signal, and for providing first control output signals in dependence on said calculated frequency and phase displacement, and means for controlling the frequency and phase of AC power applied to said motor under control of said first control output signals.

2. The control apparatus according to claim 1 further comprising a pulse generator for generating said reference signal as a series of pulses, and wherein said information signals are time signals from said digital clock stored in response to receipt of said pulses by said microprocessor.

3. The control apparatus according to claim 1 wherein said information signals representing said reference signal is in the form of a numerical constant generated in a coded form by an input means.

4. The control apparatus according to claim 1 further comprising a second set of output contacts on said microprocessor from which a numerical equivalent of the motor supply voltage is taken, said microprocessor calculating said numerical equivalent motor supply voltage in response to a detected actual speed of said motor in order to obtain a desired supply voltage corresponding to said actual speed of said motor, and digital to analog converting means responsive to signals present on said second set of output contacts for controlling said motor supply voltage.

5. The control apparatus according to claim 4 further comprising analog to digital conversion means for generating a numerical equivalent of the electric current supplied to the motor and providing said equivalent to said microprocessor, said microprocessor modifying the numerical equivalent of the motor supply voltage in dependence on the numerical equivalent of the electric current.

6. The control apparatus of claim 1 further comprising at least one additional motor, means responsive to shaft rotations of said additional motor for providing a second feedback signal train from said additional motor representing the angular velocity of its shaft, at least one additional microprocessor to which is fed said reference signal, said time signals from said digital clock, and said second feedback signal train for storing time signals from said digital clock means representative of the arrival times of signals in said second feedback signal train, for storing information signals representative of said reference signal, for calculating from said stored arrival time information and reference information signals the frequency and phase displacement of said second feedback signal train with respect to said desired frequency and phase as represented by said reference signal, and for providing second control output signals in dependence on said calculated frequency and phase displacement, and means for controlling the frequency and phase of AC power supplied to said additional motor under control of said second control output signals.

7. The control apparatus according to claim 1 wherein said feedback signal train is in the form of a pulse train.

* * * * *